US008211240B2

(12) United States Patent
Morgan

(10) Patent No.: US 8,211,240 B2
(45) Date of Patent: Jul. 3, 2012

(54) ABSORPTION OF ORGANIC LIQUIDS USING INORGANIC PARTICULATES

(76) Inventor: David H. Morgan, Longmont, CO (US)

( * ) Notice: Subject to any disclaimer, the term of this patent is extended or adjusted under 35 U.S.C. 154(b) by 428 days.

(21) Appl. No.: 12/454,694

(22) Filed: May 21, 2009

(65) Prior Publication Data

US 2010/0294308 A1 Nov. 25, 2010

(51) Int. Cl.
*B08B 7/00* (2006.01)
*B08B 7/04* (2006.01)
*C23G 1/00* (2006.01)
(52) U.S. Cl. .......... 134/7; 134/6; 134/10; 134/40
(58) Field of Classification Search .......... 134/4, 6, 134/7, 40, 42, 10; 210/690
See application file for complete search history.

(56) References Cited

U.S. PATENT DOCUMENTS

| 2,805,204 | A | * | 9/1957 | Howard | 510/215 |
| 3,842,001 | A | * | 10/1974 | Keller | 210/799 |
| 4,006,079 | A | | 2/1977 | Langlois et al. | |
| 4,151,078 | A | * | 4/1979 | Calvin | 210/671 |
| 4,481,113 | A | | 11/1984 | Canevari | |
| 4,770,715 | A | * | 9/1988 | Mandel et al. | 134/40 |
| 5,215,407 | A | | 6/1993 | Brelsford | |
| 5,976,883 | A | * | 11/1999 | Schabron | 436/28 |
| 2002/0139392 | A1 | * | 10/2002 | Cervero et al. | 134/4 |

* cited by examiner

*Primary Examiner* — Michael Kornakov
*Assistant Examiner* — Arlyn I Rivera-Cordero
(74) *Attorney, Agent, or Firm* — Mark A. Litman & Associates

(57) ABSTRACT

A method removes organic liquids from surfaces or volumes by identifying the presence of organic liquids on a surface or within a volume; providing absorbent, solid non-glass inorganic particles onto areas of the surface or within a volume where the organic liquids are present; absorbing or adsorbing organic liquids into the particles; and removing the particles with organic liquid therein.

7 Claims, No Drawings

ABSORPTION OF ORGANIC LIQUIDS USING INORGANIC PARTICULATES

BACKGROUND OF THE INVENTION

1) Field of the Invention

The present invention relates to the clean-up of organic contaminants, particularly waste or spilled organic contaminants on solid surfaces or on water, and most particularly the clean-up of hydrocarbon liquids such as oil and gasoline and diesel from spills.

2) Background of the Art

Hydrocarbon fuel, oil, and chemical spills occur frequently on a multitude of surfaces. On land, clay sorbents, cellulose or sphagnum products, surfactants, or other bioremedial methods to name a few are used in these situations with the intent of cleaning up the spill in a quick fashion or bioremediating a contaminated soil surface over time. On the water, spills tend to present unique problems and requires the responders to assess each spill quickly and choose among a variety of spill response products such as absorbents, adsorbents, gelling agents, sinking agents, surface washing agents, dispersants, biodegradation agents, biodegradation enhancers, demulsifiers, herding agents and approaches such as in situ burning. Factors such as cold water or broken ice conditions can change the physical state of crude oils making broad application of chemical dispersants more difficult and ineffective.

Various techniques and materials have been used as absorbents in helping to minimize contamination resulting from hydrocarbon fuel, oil, and chemical spills. Absorbents generally function by attracting materials to their pore spaces. Adsorbents such as polypropylene fibers function by hydrophobic nature in water and oleophilic attraction of the oil to wick into the surface area of the fiber.

U.S. Pat. No. 5,215,407 describes a process of cleaning spills of toxic or hazardous materials such as oil, antifreeze, gasoline, and the like from bodies of water, garage floors, roadways and the like, by spraying shredded fiberglass blowing wool composition particles onto the spill, absorbing the spill with the fiberglass blowing wool composition particles, and removing the fiberglass blowing wool composition particles and the spill absorbed by the fiberglass blowing wool composition particles. An absorbent composition for absorbing spills of toxic or hazardous materials comprises shredded fiberglass blowing wool particles, and cork and/or styrofoam particles dispersed with the fiberglass blowing wool particles. An absorbent sock for absorbing and for containing a spill of toxic or hazardous materials comprises an oil permeable tube, and shredded fiberglass blowing wool composition particles enclosed in the tube. Apparatus for controlling an oil slick on the surface of water comprises a craft for approaching the slick, a supply of a fiberglass blowing wool composition particles stored in the craft, and a dispensing unit on the craft for dispensing the particles onto the slick.

U.S. Pat. No. 4,481,113 describes granular media which cleanse oil from oil-in-water emulsions. These media comprise a glass or filter sand substrate. The substrate is treated with at least one trialkoxysilane wherein the alkoxy moiety comprises from 1 to 2 carbons. The granular media are back-washable to refresh their lipophilic properties.

U.S. Pat. No. 4,151,078 discloses the use of hydrophobic silica, containing sorbed HF values to remove oil from water by sorption of the oil onto the silica and then separating the oil/silica mixture from the water. Furthermore, the disclosure pertains to recovering the silica from the oil by aqueous treatment in such a manner that the hydrophobicity of the silica is overcome and the silica becomes hydrophilic, thereby releasing the oil U.S. Pat. No. 4,006,079 discloses a method of oil removal wherein glass fibers are formed from melted glass, sprayed with a binder, and collected on a conveyor in a continuous process. A woven scrim of continuous glass filaments is fed from a roll to the conveyor along with the glass fibers. The scrim and fibers pass under a sizing roll which compresses the fibers into a mat, and then through a curing oven to cure the binder. The scrim-reinforced glass fiber mat is cut into lengths, such as one hundred feet or two hundred feet, and rolled into rolls for eventual use as an oil absorbent primarily to clean up oil spills from oil tankers.

SUMMARY OF THE INVENTION

The present invention relates to methods of recovering spills of organics and especially hydrocarbons and low polarity organic chemicals from hard surfaces, in their liquid or vapor state and from porous substrates. Such recovery may be necessitated by spills or other undesirable deposits of may be the result of manufacturing or production processes, such as, for example, oil drilling and/or production, all referred to herein, generally, as a spill or "spills." More particularly, the invention relates to the absorption of certain hydrocarbons and low-polarity organic chemicals by applying primarily inorganic particulate materials that absorb the organics or hydrocarbons.

DETAILED DESCRIPTION OF THE INVENTION

The present invention relates to methods of recovering spills of organics and especially hydrocarbons and low polarity organic chemicals from hard surfaces, water and water surfaces, in their liquid or vapor state and from porous substrates. Such recovery may be necessitated by spills or other undesirable deposits of may be the result of manufacturing or production processes, such as, for example, oil drilling and/or production, all referred to herein, generally, as a spill or "spills." More particularly, the invention relates to the absorption of certain hydrocarbons and low-polarity organic chemicals by applying primarily inorganic particulate materials that absorb the organics or hydrocarbons. Although the term "organics" is generic to "hydrocarbons," the two terms are used herein for technical purposes. Preferably the inorganic materials are particulate silicates such as cement, concrete (with discrete filler therein) and the like.

The term "particulates" is defined as small particles, with regard to their shape. The particulates may be irregular, round, fibrous, fibrils, free-flowing, agglomerated or the like. The particulates should have a number average diameter of less than about 5 mm, with fewer than 5% of the particles above 15 mm. The particles will tend to break down in transit and use, so that some significant amount of powder will be present, so in the calculation of average diameters, particles of less than 0.05 mm should not be included in the number average calculation.

The particles may be applied to any surface where a spill or contamination has occurred, preferably on a solid surface such as a floor. The floor may have other materials present (e.g., water) on it and the oil will still be absorbed, but the water and oil will compete for volume within the particles and absorption of the oil will be reduced. Similarly, on shallow areas of water, where the oil floats on the surface (e.g., stagnant water, puddles and ponds), the particles may be deposited on the surface of the shallow water and some oil will be absorbed (because of initial contact with the oil before the water), but the efficiency of oil absorption is reduced. A benefit of this procedure is that the particles that collect some oil may be easily collected and/or filtered from the water and the oil removed by processes described herein.

The particles can also be applied around a spill area (even on shallow water environment, if not immersed in the water) to provide a containment barrier against the spread of oil. By keeping the particles relatively free of direct contact with saturating amounts of water, spreading oil would be absorbed by the particles, preventing spreading of the oil.

There are four chief minerals present in a Portland cement grain: tricalcium silicate ($Ca_3SiO_5$), dicalcium silicate ($Ca_2SiO_4$), tricalcium aluminate ($Ca_3Al_2O_6$) and calcium aluminoferrite ($Ca_4Al_nFe_{2-n}O_7$). The formula of each of these minerals can be broken down into the basic calcium, silicon, aluminum and iron oxides. Cement chemists use abbreviated nomenclature based on oxides of various elements to indicate chemical formulae of relevant species, i.e., $Ca=CaO$, $S=SiO_2$, $A=Al_2O_3$, and $F=Fe_2O_3$. Hence, traditional cement nomenclature abbreviates each oxide as shown in Table 1, below.

TABLE 1

Chemical formulae and cement nomenclature for major constituents of Portland cement.

| Mineral | Chemical Formula | Oxide Composition | Abbreviation |
|---|---|---|---|
| Tricalcium silicate (alite) | $Ca_3SiO_5$ | $3CaO \cdot SiO_2$ | C3S |
| Dicalcium silicate (belite) | $Ca_2SiO_4$ | $2CaO \cdot SiO_2$ | C2S |
| Tricalcium aluminate | $Ca_3Al_2O_6$ | $3CaO \cdot Al_2O_3$ | C3A |
| Tetracalcium aluminoferrite | $Ca_4Al_nFe_{2-n}O_7$ | $4CaO \cdot Al_nFe_{2-n}O_3$ | C4AF |

Abbreviation notation: $C = CaO$, $S = SiO_2$, $A = Al_2O_3$, $F = Fe_2O_3$

The composition of cement is varied depending on the application. A typical example of cement contains 50-70% C3S, 15-30% C2S, 5-10% C3A, 5-15% C4AF, and 3-8% other additives or minerals (such as oxides of calcium and magnesium). It is the hydration of the calcium silicate, aluminate, and aluminoferrite minerals that causes the hardening, or setting, of cement. The ratio of C3S to C2S helps to determine how fast the cement will set, with faster setting occurring with higher C3S contents. Lower C3A content promotes resistance to sulfates. Higher amounts of ferrite lead to slower hydration. The ferrite phase causes the brownish gray color in cements, so that "white cements" (i.e., those that are low in C4AF) are often used for aesthetic purposes.

The calcium aluminoferrite (C4AF) forms a continuous phase around the other mineral crystallites, as the iron containing species act as a fluxing agent in the rotary kiln during cement production and are the last to solidify around the others.

The raw materials for Portland cement production are a mixture (as fine powder in the 'Dry process' or in the form of a slurry in the 'Wet process') of minerals containing calcium oxide, silicon oxide, aluminum oxide, ferric oxide, and magnesium oxide. The raw materials are usually quarried from local rock, which in some places is already practically the desired composition and in other places requires the addition of lay and limestone as well as iron ore bauxite recycled materials. The individual raw materials are first crushed, typically to below 50 mm. In many plants, some or all of the raw materials are then roughly blended in a "prehomogenization pile." The raw materials are next ground together in a rawmill. Silos of individual raw materials are arranged over the feed conveyor belt. Accurately controlled proportions of each material are delivered onto the belt by weigh-feeders. Passing into the rawmill, the mixture is ground to rawmix. The fineness of rawmix is specified in terms of the size of the largest particles, and is usually controlled so that there are less than 5%-15% by mass of particles exceeding 90 μm in diameter. It is important that the rawmix contains no large particles in order to complete the chemical reactions in the kiln, and to ensure the mix is chemically homogenous. In the case of a dry process, the rawmill also dries the raw materials, usually by passing hot exhaust gases from the kiln through the mill, so that the rawmix emerges as a fine powder. This is conveyed to the blending system by conveyor belt or by a powder pump. In the case of wet process, water is added to the rawmill feed, and the mill product is a slurry with moisture content usually in the range 25-45% by mass. This slurry is conveyed to the blending system by conventional liquid pumps.

The rawmix is formulated to a very tight chemical specification. Typically, the content of individual components in the rawmix must be controlled within 0.1% or better. Calcium and silicon are present in order to form the strength-producing calcium silicates. Aluminum and iron are used in order to produce liquid ("flux") in the kiln burning zone. The liquid acts as a solvent for the silicate-forming reactions, and allows these to occur at an economically low temperature. Insufficient aluminum and iron lead to difficult burning of the clinker, while excessive amounts lead to low strength due to dilution of the silicates by aluminates and ferrites. Very small changes in calcium content lead to large changes in the ratio of alite to belite in the clinker, and to corresponding changes in the cement's strength-growth characteristics. The relative amounts of each oxide are therefore kept constant in order to maintain steady conditions in the kiln, and to maintain constant product properties. In practice, the rawmix is controlled by frequent chemical analysis (hourly by X-Ray fluorescence analysis, or every three minutes by prompt gamma neutron analysis). The analysis data is used to make automatic adjustments to raw material feed rates. Remaining chemical variation is minimized by passing the raw mix through a blending system that homogenizes up to a day's supply of rawmix (15,000 tons in the case of a large kiln).

Expansive cement is a cement that when mixed with water forms a paste that tends to increase in volume, after setting, to a significantly greater degree than portland cement paste does; used to compensate for volume decrease due to shrinkage or to induce tensile stress in reinforcement. Classified as Type K: Contains anhydrous aluminosulfate burned simultaneously with a portland cement composition, or burned separately when it is to be inter-ground with portland cement clinker or blended with Portland cement, calcium sulfate, and free lime. Type M: A mixture of portland cement, calcium aluminate cement, and calcium sulfate. Type S: A Portland cement containing a large computed tricalcium aluminate content, modified by an excess of calcium sulfate above usual optimum content.

Concrete is a construction material composed of cement and other cementitious materials such as fly ash and slag cement, aggregate (generally a coarse aggregate such as gravel, limestone, or granite, plus a fine aggregate such as sand), water, and chemical admixtures. Concrete solidifies and hardens after mixing with water and placement due to a chemical process known as hydration. The water reacts with the cement, which bonds the other components together, eventually creating a stone-like material. Concrete is used to make pavements, architectural structures, foundations and motorways. In the practice of the present technology, the size of aggregates should be limited so as to provide significant surface area/volume as compared to what would be provided with gravel and medium-size stone additives. As the number average diameter of the inorganic particulates used in the present technology should be less than 5 mm, additives larger that 5 mm tend to be counterproductive, even if functional. Preferred ranges of particulates Mortar, and especially lime mortar was used in the construction of the vast majority of brick and stone buildings worldwide from ancient times until the widespread adoption of Portland cement in the late nineteenth century. It is still used today, for the repair of such buildings and occasionally for new construction. Most data and information about lime mortars has been via hearsay, folklore, trade knowledge and the vast number of old buildings still standing and being maintained. It has only been in the last decade that scientific and empirical testing has proven lime mortar's durability and made it more widely known. There are several types of lime mortar, usually classified as non-hydraulic (lime) mortar, hydraulic (lime) mortar and lime with cement.

Concrete is a composite material consisting of mineral aggregates (gravel and sand), cement, water, air, and possibly a few admixtures and, or, fly ash as a partial replacement for some of the cement. Aggregates are chemically inert and are bound together by the cement. They are there to give bulk to the concrete and are not involved in the chemical processes that make it "set up". Aggregates are approximately 70 to 80% of the volume of concrete. Most aggregates used in concrete have little absorptive properties themselves. Usually 1 to 2%, or less by weight. Sometimes lightweight, or manufactured lightweight aggregates are used for specialized engineered structures. These aggregates may have absorptions of around 5% or more. It is the reacted cement and water paste in the concrete mass that has the higher absorption values.

The cement in concrete needs water to hydrate and harden. Hydration is a chemical reaction in which the major compounds in cement form chemical bonds with water molecules and become hydrates or hydration products. The calcium silicates are the main part of the chemical reaction. When the calcium silicates first come into contact with water, the reaction occurs. Calcium ions are formed and the water molecules are broken down to form hydroxide ions. This bond breaking also produces heat.

Hardened concrete contains some entrapped air from the resulting chemical reaction of cement and water. Sometimes air entrainment admixtures are added to increase the air content of concrete for engineering purposes. Most exterior structures have this to reduce freeze-thaw and other weathering effects.

Freshly mixed concrete can be cast into any shape desired. It is one of the most widely used construction materials in the world. Because of its abundance, many structures have been built with it worldwide. When these structures have reached their service life, they are subsequently demolished. This demolition serves as a source of raw material for this invention, as well as other uses not described here.

One significant and useful source of the concrete, cement and mortar particulates of the present technology is from structural waste of those materials, as opposed to virgin manufacture of the particulates. Waste inorganic material (concrete) may be crushed to an appropriate particle size in mills, or grinding apparatus. As the size of the particles does not require a high tolerance, simple particularization technologies may be used. These silicate inorganic materials can be used in essentially any composition and from any source, as long as they are sufficiently clean (e.g., not already significantly contaminated with absorbed material so that the particles are not absorbent) to be able to absorb organic materials.

Another significant benefit of the present technology is that the absorbed or adsorbed organic materials can be removed from the inorganic particles and the particulates reused. Even though the particulates will tend to devalue (become diminished in size from further breakage) over time with usage, there is still some capability in recycling the particles for repeated use. Recycling of the particulates can be done in a number of ways. The particles can be heated to cause the absorbed/adsorbed materials to flow from the particles or evaporate from the particles (this has a low level effect, but provides some benefits). The particles may be incinerated as mildly as possible to burn off organics without using temperatures so high as to decompose or excessively stress the particles. Very low weight, volatile organics (e.g., C1-C5) alcohols can be used to leach organics from the particles. Combinations of these methods may also be used.

When the term "cement" is used to describe a component of the particulates used in the present technology, the term refers to hydrolyzed cement and not the dry product before reaction to a hardened state. This cement may contain additional ingredients, including those used to convert the cement into concrete or other structural material.

Prophetic Example

Residential cement from a sidewalk or patio would be crushed after it was torn up during a renovation projected. The waste cement would be partially crushed with manual tools and fed into a grinder with at least a 1 mm gap, up to a 120 mm gap. The grinder would be used until all materials were crushed to sizes below 15 mm to form the cement absorbent particulates. Car grade 10/30 oil would be present on a garage surface either intentionally for an example or from an accidental spill. The cement absorbent particulates would be applied to the oil coated garage surface as soon as possible to avoid immediate absorption into the garage floor. The cement absorbent particulates would be lightly brushed across the floor surface to maximize particle contact with the oil on the floor surface. After contact for a few minutes, the cement absorbent particulates would be swept up, with oil entrapped therein.

The particulates with oil entrapped therein would then go through a cleaning (oil-removal) process to remove a significant amount of absorbed oil (e.g., at least 50% of the total weight of the soil in the particles, preferably at least 75% of the absorbed oil, and most preferably at least 90% of the absorbed oil). The "cleansed" particles would then be used on future oil spill situations.

Although specific numbers have been used in the specification, and specific compositions provided as species of materials that may be used, the intent of the specification is to provide a generic concept and enablement of an invention, the use of non-glass (solids, not supercooled liquid) particulate absorbents for removing organic materials from surfaces or volumes. The particulates are preferably porous (e.g., at least 2% open volume within the particles, and preferably at least 4% open volume in the inorganic particles). The claims should be interpreted with this generic concept in mind.

What is claimed is:

1. A method of removing organic liquids from surfaces or volumes comprising:
   identifying the presence of organic liquids on a surface or within a volume;
   providing absorbent, solid non-glass inorganic particles onto areas of the surface or within a volume where the organic liquids are present;
   absorbing organic liquids into the particles; and removing the particles with organic liquid therein, wherein the particles consist essentially of cement particles having a number average diameter of 1 to 15 mm and the particles absorb the organic liquids.

2. The method of claim 1 wherein after removing the particles with organic liquid absorbed therein, at least 50% of the organic liquid is removed from the particles and the particles are then placed into contact with organic liquids on a surface or within a volume to again remove organic liquid from a surface or volume.

3. The method of claim 1 wherein the particles consist of at least 40% by weight of silicates.

4. The method of claim 3 wherein after removing the particles with organic liquid absorbed therein, at least 50% of the organic liquid is removed from the particles and the particles are then placed into contact with organic liquids on a surface or within a volume to again remove organic liquid from a surface or volume.

5. The method of claim 3 wherein the particles comprise particles having a number average diameter of between 5 and 15 mm.

6. The method of claim 5 wherein after removing the particles with organic liquid therein, at least 50% of the organic liquid is removed from the particles and the particles are then placed into contact with organic liquids on a surface or within a volume to again remove organic liquid from a surface or volume.

7. The method of claim 6 wherein organic liquid is removed from particles by application of a thermal or oxidative process.

* * * * *